United States Patent
da Silva et al.

(10) Patent No.: US 11,071,048 B2
(45) Date of Patent: *Jul. 20, 2021

(54) INDICATOR-CONTROLLED UTILIZATION OF OUTDATED CONFIGURATION DEFINED IN ACCESS INFORMATION TABLE FOR ACCESS NETWORK

(71) Applicant: Telefonaktiebolaget LM Ericsson (publ), Stockholm (SE)

(72) Inventors: Icaro L. J. da Silva, Solna (SE); Gunnar Mildh, Sollentuna (SE); Jose Luis Pradas, Stockholm (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 84 days.

This patent is subject to a terminal disclaimer.

(21) Appl. No.: 16/453,309

(22) Filed: Jun. 26, 2019

(65) Prior Publication Data

US 2019/0320382 A1 Oct. 17, 2019

Related U.S. Application Data

(63) Continuation of application No. 15/757,174, filed as application No. PCT/EP2015/070296 on Sep. 4, 2015, now Pat. No. 10,368,302.

(51) Int. Cl.
*H04W 48/16* (2009.01)
*H04W 48/10* (2009.01)
(Continued)

(52) U.S. Cl.
CPC .......... *H04W 48/16* (2013.01); *H04W 48/10* (2013.01); *H04W 68/02* (2013.01);
(Continued)

(58) Field of Classification Search
CPC ..... H04W 48/00; H04W 48/02; H04W 48/08; H04W 48/10; H04W 48/16;
(Continued)

(56) References Cited

U.S. PATENT DOCUMENTS

| 2002/0093943 A1* | 7/2002 | Oliveira | ............... H04L 12/185 370/352 |
| 2004/0203693 A1 | 10/2004 | Quinn et al. | |

(Continued)

FOREIGN PATENT DOCUMENTS

| EP | 2373072 A1 | 10/2011 |
| EP | 2903349 A1 | 8/2015 |

(Continued)

OTHER PUBLICATIONS

Frenger, Paål, et al., "A Clean Slate Radio Network Designed for Maximum Energy Performance", 2014 IEEE 25th Annual International Symposium on Personal, Indoor, and Mobile Radio Communication (PIMRC), Sep. 2, 2014, 1300-1304.

(Continued)

*Primary Examiner* — Warner Wong
(74) *Attorney, Agent, or Firm* — Sage Patent Group

(57) ABSTRACT

A radio device receives an access information table from the cellular network. The access information table comprises parameters of a plurality of configurations for controlling access of the radio device to the cellular network. Further, the radio device receives an identifier from the cellular network. Depending on the identifier, the radio device selects one of the configurations from the access information table. In response to determining that at least one of the received access information table and the received identifier is outdated, the radio device determines, depending on an indicator associated with the selected configuration, whether (Continued)

to perform an access attempt to the cellular network on the basis of the selected configuration.

19 Claims, 8 Drawing Sheets

(51) Int. Cl.
*H04W 68/02* (2009.01)
*H04L 12/28* (2006.01)
*H04W 74/00* (2009.01)
*H04L 12/24* (2006.01)
*H04W 84/04* (2009.01)

(52) U.S. Cl.
CPC ...... *H04L 12/2856* (2013.01); *H04L 41/0866* (2013.01); *H04W 74/002* (2013.01); *H04W 84/042* (2013.01)

(58) Field of Classification Search
CPC ... H04W 84/042; H04W 68/02; H04W 74/00; H04W 74/002; H04W 4/50; H04L 41/08; H04L 41/0803; H04L 41/0866; H04L 12/2856; H04L 29/06823; H04L 63/10
See application file for complete search history.

(56) References Cited

U.S. PATENT DOCUMENTS

| | | | |
|---|---|---|---|
| 2006/0236083 A1 | 10/2006 | Fritsch et al. | |
| 2006/0291501 A1* | 12/2006 | Nicol | H04W 52/0229 370/465 |
| 2010/0183031 A1 | 7/2010 | Dalsgaard et al. | |
| 2012/0276933 A1 | 11/2012 | Laitinen | |
| 2013/0195003 A1 | 8/2013 | Lee et al. | |
| 2014/0064158 A1 | 3/2014 | Timus | |
| 2014/0329503 A1 | 11/2014 | Deng | |
| 2015/0312823 A1 | 10/2015 | Li et al. | |
| 2015/0327155 A1 | 11/2015 | Lee et al. | |
| 2015/0334644 A1* | 11/2015 | Kim | H04W 48/14 370/329 |
| 2015/0341848 A1 | 11/2015 | Song et al. | |
| 2016/0029344 A1* | 1/2016 | Vannithamby | H04W 68/02 455/458 |
| 2016/0043849 A1 | 2/2016 | Lee et al. | |
| 2016/0269988 A1 | 9/2016 | Li et al. | |
| 2016/0309518 A1 | 10/2016 | Patel et al. | |
| 2016/0378454 A1 | 12/2016 | Nekrestyanov et al. | |
| 2018/0288679 A1* | 10/2018 | Hessler | H04W 28/0231 |

FOREIGN PATENT DOCUMENTS

| | | |
|---|---|---|
| WO | 2009004012 A1 | 1/2009 |
| WO | 2011100707 A1 | 8/2011 |
| WO | 2013183966 A1 | 12/2013 |

OTHER PUBLICATIONS

Unknown, Author, "5G—Key Component of the Networked Society", RWS-150009, 3GPP RAN Workshop on 5G, Phoenix, Arizona, USA, Sep. 17-18, 2015, 1-55.
Unknown, Author, "Correction to detection of system information change by UE", 3GPP TSG-WG2 Meeting #74, R2-113227, Barcelona, Spain, May 9-13, 2011, 1-3.
Unknown, Author, "Small correction to SI81 provisioning via dedicated signalling", 3GPP TSG-RAN WG2 Meeting #81, R2-130441, St. Julian's, Malta, Jan. 28-Feb. 1, 2013, 1-6.
Unknown, Author, "System information acquisition for low complexity and coverage enhanced UEs", 3GPP TSG-RAN WG2 #89, Tdoc R2-150454, Ericsson, Feb. 9-13, 2015, 1-8.

* cited by examiner

INDICATOR-CONTROLLED UTILIZATION OF OUTDATED CONFIGURATION DEFINED IN ACCESS INFORMATION TABLE FOR ACCESS NETWORK

TECHNICAL FIELD

The present invention relates to methods for controlling access to a cellular network and to corresponding devices.

BACKGROUND

In a cellular network based on the LTE (Long Term Evolution) radio access technology (RAT) specified by the $3^{rd}$ Generation Partnership Project (3GPP), when a user equipment (UE) initially accesses the cellular network, the UE needs to acquire what is called system information (SI). This is typically accomplished via broadcast of certain information in each cell. The broadcasted information includes a primary synchronization signal (PSS) and a secondary synchronization signal (SSS), which may be used by the UE to obtain frequency and time synchronization. These sequences also encode the physical cell identity (PCI). After the physical layer synchronization and PCI detection, the UE is capable of performing channel estimation using the constantly broadcasted cell specific reference signals (C-RSs) and, then, consequently, may finally decode the SI. The PSS and SSS are respectively transmitted in the first and sixth subframes within a radio frame. Accordingly, the PSS/SSS and C-RSs are always broadcasted by the network. These are used by the UE to synchronize to a given cell and enabling channel estimation.

The SI is broadcasted in each cell by System Information Blocks (SIBs), each of which contains a set of functionally related parameters. The SIB types that have been defined include a Master Information Block (MIB), which includes a limited number of the most frequently transmitted parameters which are essential for the UE's initial access to the network, a System Information Block Type 1 (SIB1), which contains parameters needed to determine if a cell is suitable for cell selection, as well as information about time-domain scheduling of the other SIBs, a System Information Block Type 2 (SIB2), which includes common and shared channel information, System Information Blocks of Type 3 to 8 (SIB3-SIB8), which include parameters used to control intra-frequency, inter-frequency and inter-RAT cell reselection, System Information Block Type 9, which is used to signal the name of a Home eNodeB (HeNB), System Information Blocks of Type 3 to 8 (SIB3-SIB8), which include Earthquake and Tsunami Warning Service (ETWS) notifications and Commercial Mobile Alert System (CMAS) warning messages, System Information Block Type 13 (SIB13), which includes MBMS (Multimedia Broadcast Multicast Service) related control information, System Information Block Type 14 (SIB14), which is used to configure Extended Access Barring (EAB), System Information Block Type 15 (SIB15), which is used to convey MBMS mobility related information, and System Information Block Type 16 (SIB16), which is used to convey GPS (Global Positioning System) related information. This list of SIB types has been expanding over the years, and this expansion may be expected to continue as the 3GPP LTE RAT evolves.

Some of the SI is defined as being "essential information", e.g., the information contained in the MIB, SIB1, and SIB2. For UEs which are EAB capable, the information in SIB14 is also considered as "essential information". Here, "essential information" is considered to be information that the UE should acquire before accessing the cellular network.

In the LTE RAT, the SI, i.e., the MIB and the SIBs, is constantly broadcasted, but depending on the type of information, different periodicities are used. For example, the MIB and SIB1 may be broadcasted with periodicities of 40 ms and 80 ms. Furthermore, for the MIB the transmission is repeated four times during each broadcast period, i.e., every 10 ms. The SIB1 is also repeated four times within each broadcast period, i.e. every 20 ms, but with a different redundancy version for each transmission. For other SIB types, the time-domain scheduling may be dynamically adapted. In particular, each SIB may be is transmitted in a periodically-occurring time-domain window, while physical layer control signaling indicates in which subframes within this window the SI is actually transmitted. The scheduling windows of the different SIBs (referred to as SI-windows) are consecutive, i.e., without overlaps or gaps between them, and have a common length that is configurable. The SI-windows can include subframes in which it is not possible to transmit SIBs, such as subframes used for the SIB1, and subframes used for the uplink in TDD (Time Division Duplex Mode).

As can be seen, the way of transmitting the SI in the LTE RAT may result in a significant amount of signals that are constantly broadcasted.

To increase efficiency of fifth generation (5G) cellular networks, a concept was suggested which is based on a layered transmission of access information (see, e.g., "A Clean Slate Radio Network Designed for Maximum Energy Performance" by P. Frenger et al., presented on the IEEE 25th Annual International Symposium on Personal, Indoor, and Mobile Radio Communications (PIMRC), Washington, D.C., Sep. 2-5, 2014). In this concept, user equipments (UEs) are provided with access information by using broadcasted access information tables (AITs) and broadcasted system signature sequences (SSSs), wherein each SSS may be used to identify information from the broadcasted AIT. The AIT may for example define settings concerning a how a UE shall access the system, e.g., by a random access procedure, concerning how the UE can be reached by the system in a paging procedure, or concerning more advanced settings, such as related to beam forming or link adaptation. The AITs are typically transmitted with long periodicity, while the SSSs are typically transmitted more frequently. Typically each access node (e.g., a base station) will transmit an SSS which allows the UE to identify the information applicable to this access node from the AIT. The AITs do not need to be transmitted by every access node. For example, a base stations serving a macro cell may transmit both an AIT and an SSS, while a base station serving a small cell within a coverage region of the macro cell may transmit only an SSS. Accordingly, the AIT will typically include entries defining various configurations which apply to various access nodes. The AIT may therefore have considerable size, so that in view of resource efficiency it is generally desirable to broadcast the AIT at a relatively low update rate.

However, when broadcasting the AIT at a low update rate, situations may occur where the AIT received by the UE is outdated, e.g., because a certain configuration as identified by the SSS received by the UE has been changed by the network, but the updated AIT was not yet broadcasted to the UE or because the UE has moved to another area where another AIT is valid, but this other AIT was not yet received by the UE. In some situations, it is also possible that the last SSS received by the UE does not point to the correct configuration in the AIT, i.e., that the SSS or the mapping of SSSs to entries of the AIT is outdated. Before the UE can access the cellular network, it may thus need to wait until it has received a valid AIT and a valid SSS.

In order to avoid latency resulting from a need to wait for receiving a valid AIT or SSS, the UE may also use the previously received AIT and/or SSS even though in may be outdated. However, this involves a risk of the UE attempting to access the cellular network on the basis of an inappropriate configuration, which may cause failure of the access attempt or even result in network-side misconfigurations which impact operation of the cellular network also with respect to other UEs. In other situations, using the configuration determined from the outdated AIT or SSS may be possible without a significant risk of such problems.

Accordingly, there is a need for techniques which allow for efficiently controlling access to a cellular network on the basis of an AIT defining a plurality of configurations that may be selected by a UE when accessing the cellular network.

SUMMARY

According to an embodiment of the invention, a method of controlling access to a cellular network is provided. According to the method, a radio device receives an AIT from the cellular network. The AIT comprises parameters of a plurality of configurations for controlling access of the radio device to the cellular network. Further, the radio device receives an identifier from the cellular network. Depending on the identifier, the radio device selects one of the configurations from the AIT. In response to determining that at least one of the received AIT and the received identifier is outdated, the radio device determines, depending on an indicator associated with the selected configuration, whether to access the cellular network on the basis of the selected configuration.

According to a further embodiment of the invention, a method of controlling access to a cellular network is provided. According to the method, a node of the cellular network determines an AIT transmitted to a radio device. The AIT comprises parameters of a plurality of configurations for controlling access of the radio device to the cellular network. The configurations are selectable on the basis of an identifier received by the radio device. Further, the node associates an indicator with at least one the configurations. The indicator enables the radio device to determine whether to access the cellular network on the basis of one of the configurations when at least one of the AIT and the identifier as received by the radio device is outdated, the one of the configurations being selected from the AIT based on the identifier.

According to a further embodiment of the invention, a radio device is provided. The radio device is configured to receive an AIT from the cellular network. The AIT comprises parameters of a plurality of configurations for controlling access of the radio device to the cellular network. Further, the radio device is configured to receive an identifier from the cellular network. The radio device is configured to select, depending on the identifier, one of the configurations from the AIT. Further, the radio device is configured to determine, in response to determining that at least one of the received AIT and the received identifier is outdated, whether to access the cellular network on the basis of the selected configuration, which is accomplished depending on an indicator associated with the selected configuration.

According to a further embodiment of the invention, a node for a cellular network is provided. The node is configured to determine an AIT transmitted to a radio device. The AIT comprises parameters of a plurality of configurations for controlling access of the radio device to the cellular network. The configurations are selectable on the basis of an identifier received by the radio device. Further, the node is configured to associate an indicator with at least one the configurations. The indicator enables the radio device to determine whether to access the cellular network on the basis of one of the configurations when at least one of the AIT and the identifier as received by the radio device is outdated, the one of the configurations being selected from the AIT based on the identifier.

According to a further embodiment of the invention, a computer program or computer program product is provided, e.g., in the form of a non-transitory storage medium, which comprises program code to be executed by at least one processor of a radio device. Execution of the program code causes the radio device to receive an AIT from the cellular network. The AIT comprises parameters of a plurality of configurations for controlling access of the radio device to the cellular network. Further, execution of the program code causes the radio device to receive an identifier from the cellular network. Further, execution of the program code causes the radio device to select, depending on the identifier, one of the configurations from the AIT. Further, execution of the program code causes the radio device to determine, in response to determining that at least one of the received AIT and the received identifier is outdated, whether to access the cellular network on the basis of the selected configuration, which is accomplished depending on an indicator associated with the selected configuration.

According to a further embodiment of the invention, a computer program or computer program product is provided, e.g., in the form of a non-transitory storage medium, which comprises program code to be executed by at least one processor of a node of a cellular network. Execution of the program code causes the node to determine an AIT transmitted to a radio device. The AIT comprises parameters of a plurality of configurations for controlling access of the radio device to the cellular network. The configurations are selectable on the basis of an identifier received by the radio device. Further, execution of the program code causes the node to associate an indicator with at least one the configurations. The indicator enables the radio device to determine whether to access the cellular network on the basis of one of the configurations when at least one of the AIT and the identifier as received by the radio device is outdated, the one of the configurations being selected from the AIT based on the identifier.

Details of such embodiments and further embodiments will be apparent from the following detailed description of embodiments.

DETAILED DESCRIPTION

Figure 1:
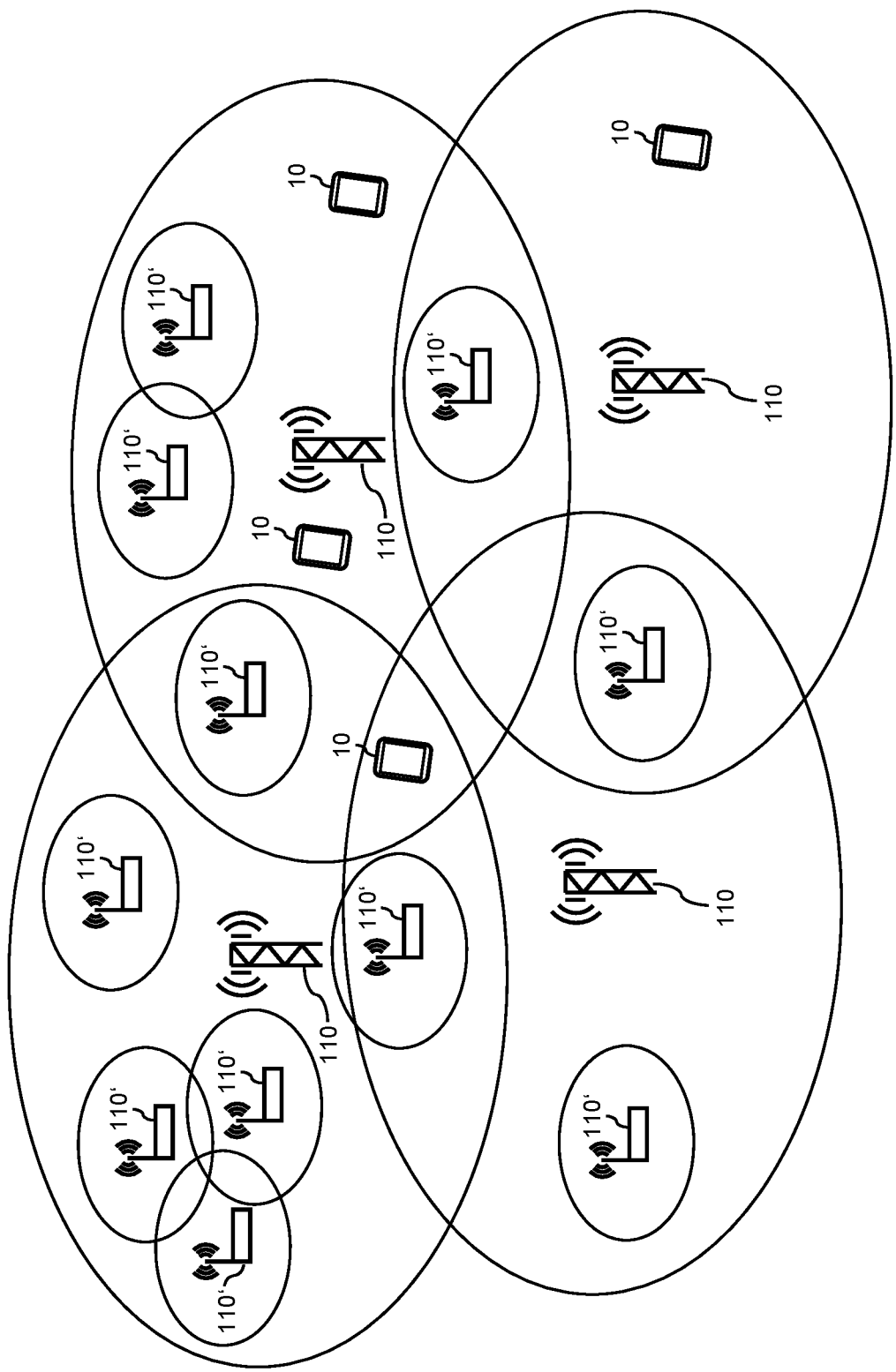
FIG. 1 schematically illustrates a cellular network architecture in which access control is implemented according to an embodiment of the invention.

In the following, concepts in accordance with exemplary embodiments of the invention will be explained in more detail and with reference to the accompanying drawings. The illustrated embodiments relate to control of access to a cellular network by communication devices, in the following also referred to as UEs. In the illustrated examples, it is assumed that information which is utilized by the UEs for accessing the cellular network is provided in a layered manner to the UEs. Specifically, AITs are transmitted by some access nodes of the cellular network to the UEs. The AITs include entries which are each identified by an identifier, and each of such entries includes one or more parameters of a configuration which may be selected by the UE to be applied when accessing the cellular network, in particular a certain cell of the cellular network. The identifier may correspond to a system signature sequence as transmitted by access node of the cellular network. The access nodes each transmit such identifier, and the UEs may utilize this transmitted identifier to identify an entry of the AIT which is applicable for the specific access node or for a cell controlled by this access node. The system signature sequence may encode an index which differs between different access nodes. In the following, the identifier is thus also referred to as SSI (System Signature Index). The AITs do not need to be transmitted by every access node. That is to say, there may be access nodes which transmit the identifier, but no AIT. The UEs may then utilize the transmitted identifier to identify an AIT entry of an AIT transmitted by another access node. Further, the AITs may be transmitted less frequently than the identifiers. Accordingly, changes in the way of utilizing a certain access node for accessing the cellular network may be indicated by modifying the identifier transmitted by this access node. The cellular network may for example be based on a 5G radio access technology, such as an evolution of the LTE RAT. However, it is to be understood that the illustrated concepts could also be applied to other RATs.

In the illustrated concepts, it is assumed that certain configurations, when being applied in an erroneous way, are more likely to cause problems than others. Examples of such configurations which have a high likelihood of causing problems when applied in an erroneous way are a configuration defining utilization of high transmission power in a random access procedure, configurations defining unusual radio resource allocations for a random access procedure, or configurations defining unusual radio resource allocations for a HARQ (Hybrid Automatic Repeat Request) mechanism. In each of these example, the deviations from typically used parameters might not only affect an attempted access on the basis of such configuration, resulting in failure of the access, but may also cause interference or other disturbances which affect other access attempts or radio transmissions in the cellular network. Accordingly, usage of such configurations should be avoided if the AIT and/or the SSI, on the basis of which such configuration was determined, are found to be outdated. On the other hand, configurations which have a low likelihood of causing problems may be utilized by the UE for accessing the cellular network, even if they are based on an outdated AIT and/or SSI, thereby avoiding latency associated with the UE waiting to receive an update of the AIT and/or a new SSI. In other words, some configurations are allowed to be used for accessing the cellular network in an opportunistic way, i.e., on the basis of the presumption that a configuration determined from an outdated AIT and/or SSI will nonetheless work, i.e., result in an successful access to the cellular network, or at least will not adversely affect operation of the cellular network, while for other configurations such opportunistic accesses are forbidden. In this connection, the AIT or the SSI being determined as outdated by the UE can be the result of the UE having missed to receive the AIT or SSI on a configured update occasion. The AIT or SSI is then not up to date from the perspective of the UE, even though it may actually not have changed. For example, the AIT or SSI being outdated may be detected by the UE by monitoring missed update occasions or on the basis of a validity timer associated with the AIT and/or a validity timer associated with the SSI. Such missed update occasions may for example be due to poor radio conditions or due to the UE having been in an energy saving state with limited receive capability. The UE may also assume that a previously received AIT or SSI is outdated when it has entered another area of the cellular network, but not yet received a new AIT or SSI.

In the illustrated concepts, this decision or determination whether or not to allow an opportunistic access based on a certain configuration is taken by the UE, on the basis of an indicator associated with the configuration or with some parameters of the configuration. It should be noted that the terms "decision" and "determination" are used interchangeably throughout this application. This indicator will in the following also be referred to as "risk indicator". The risk indicator may be provided to the UE as part of the AIT. For example, a corresponding risk indicator may be associated with each configuration defined in the AIT and be included in the corresponding entry of the AIT. The risk indicator may be a binary flag, e.g., indicating "risky" or "not risky", or may be a multi-bit value encoding more than two risk levels. In some scenarios, a single risk indicator may also apply to multiple or even all configurations of the AIT. In such cases, the risk indicator may also be provided separately from the AIT to the UE or even be preconfigured in the UE. For example, such a global risk indicator could be used to control whether opportunistic access attempts are generally allowed or forbidden for the UE.

If the risk indicator associated with the configuration selected from the AIT indicates that the selected configuration is not risky, the UE may decide to perform an opportunistic access attempt based on the selected configuration, i.e., attempt to access the cellular network based on the parameters of the selected configuration even though the AIT and/or the SSI received by the UE were found to be outdated. On the other hand, if the risk indicator associated with the configuration selected from the AIT indicates that the selected configuration is risky, the UE may deny such opportunistic access attempt but rather access the cellular network in a regular manner, when the AIT and/or SSI have been updated. Further, rather than using the risky configuration, the UE may rather use an alternative configuration which differs from the risky configuration which respect to one or more parameters. Such alternative configuration may be stored as a fallback configuration in the AIT or may be preconfigured in the UE, e.g., as part of a default configuration.

FIG. 1 schematically illustrates a cellular network architecture which may be used for implementing the concepts as outlined above. In particular, FIG. 1 illustrates UEs 10 various access nodes 110, 110' of the cellular network. In the illustrated example, the access nodes 110, 110' are assumed to be base stations 110 serving macro cells and base stations 110' serving small cells, e.g., pico cells or femto cells, within a coverage region of such macro cell.

As mentioned above, the UEs 10 utilize information from AITs received from the cellular network to control their respective access to the cellular network. Such control of the access may for example relate to a random access procedure performed by the UE 10 for gaining initial access to the cellular network or to a paging procedure performed by the cellular network to reach a certain UE 10. Further, the information from the AITs may be utilized by the UE 10 for setting a beam-forming configuration, a link adaptation configuration, and/or a HARQ configuration applied when accessing the cellular network. The AIT entry including the information which is applicable for a specific access node 110, 110' is identified by the UE 10 on the basis of the identifiers transmitted by each access node 110, 110'. In the following, it will be assumed that the identifiers correspond to an SSI transmitted by each access node 110, 110'. It should be noted that the AIT transmitted by the access nodes 110 and the AIT transmitted by the access node 110', if transmitted, may be different from one another or may be identical.

Broadcast transmissions may be utilized for providing the AITs and the SSIs to the UEs 10. Here, a broadcast transmission is considered to be a transmission addressed to all UEs 10 in a certain coverage area of the cellular network. The broadcast transmission may be a single frequency network (SFN) transmission covering multiple cells of the cellular network. However, other transmission modes could be utilized as well, e.g., unicast transmissions or multicast transmissions. Here, a unicast transmission is considered to be a transmission addressed to one specific UE 10 and a multicast transmission is considered as a transmission which is addressed to a certain group of UEs 10. Also the multicast transmission may be an SFN transmission covering multiple cells of the cellular network.

The AITs do not need to be transmitted by each access node 110, 110'. In the illustrated example, the AITs are assumed to be transmitted only by the access nodes 110 serving the macro cells, thereby ensuring that the AITs can be received throughout the coverage area of the cellular network. Further, each of the base stations 110 serving the macro cells and the base stations 110' serving the small cells broadcasts a corresponding SSI. Here, it is to be understood that the broadcasted SSIs may vary between the access nodes 110, 110'. However, it is also possible that certain access nodes 110, 110' broadcast the same SSI, e.g., when similar access parameters apply for these access nodes 110, 110'. By way of example, in the scenario of FIG. 1 the base stations 110 serving the macro cells could broadcast a first SSI, and the base stations 110' serving the small cells could broadcast a second SSI which is different from the first SSI.

Figure 2:
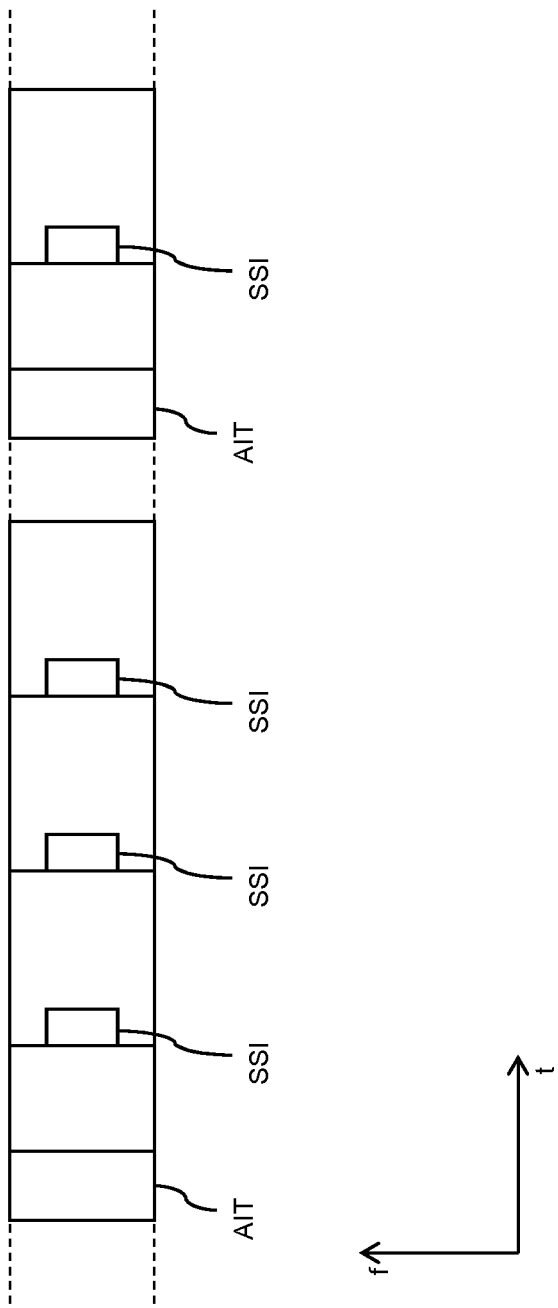
FIG. 2 schematically illustrates transmission of AITs and identifiers according to an embodiment of the invention.

FIG. 2 shows an example of how transmission of the AIT and the SSI may be organized in the time (t) and frequency (f) domain. As illustrated, the SSIs are transmitted more frequently than the AIT. For example, a relatively long periodicity, e.g., from 1.024 s up to 10.24 s, may be utilized for transmission of the AIT, while a shorter periodicity, e.g., of about 100 ms, may be utilized for transmission of the SSI. It should be noted that both periodicities may be longer than a granularity of resource allocation in the time domain, which may for example be based on time slots in the order of 1 ms.

Each SSI may for example define a 10 bit data value, which allows for distinguishing between 1024 different SSIs. The received SSI is utilized by the UE 10 to identify an applicable entry of the received AIT, which defines a configuration to be used by the UE 10 when accessing the cellular network.

Figure 3:
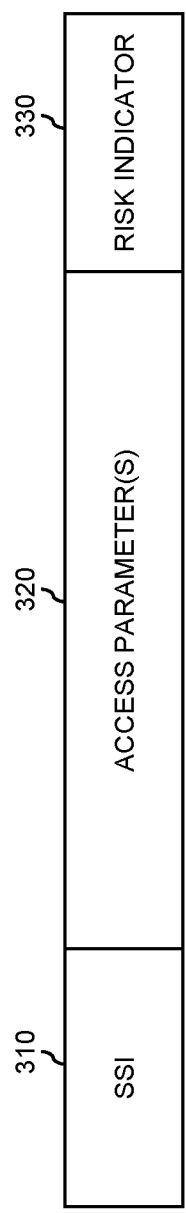
FIG. 3 shows an exemplary entry of an AIT according to an embodiment of the invention.

FIG. 3 schematically illustrates an entry of the AIT, corresponding to a particular configuration which can be used by the UE 10 for accessing the cellular network. As illustrated, the entry includes an SSI 310, access parameter(s) 320, and a risk indicator 330. It should be noted that although the terminology "parameter" is used throughout this application, it should be understood that value(s) or information concerning the parameter(s) are included in the AIT. The SSI 310 in the entry of the AIT may be matched to the SSI received by the UE 10 so as enable the UE 10 to identify and select the configuration defined by the access parameters 320. The risk indicator 330 indicates the likelihood that using the configuration when performing an opportunistic access attempt will cause problems. The risk indicator 330 may be a flag, i.e., be encoded by a single bit indicating either "risky" or "not risky". Alternatively, the indicator could be a multi-bit value which encodes a higher number of risk levels. The latter option may allow for representing a risk rating by the risk indicator. Such risk rating may allow for configuring the UE 10 with more complex rules for deciding whether to allow opportunistic access based on the configuration. For example, such rules could consider contextual parameters, such as a type of access node and/or cell with which the access attempt would be performed, an importance or Quality of Service setting associated with an application triggering the access, e.g., by defining a rule according to which opportunistic access attempts triggered by an emergency call would always be allowed, a subscription type or policies associated with the subscription, or the like.

A sensitivity rating may also be used for allowing tuning of the decision by the UE 10 from the network side. For this purpose, rules may be configured in the UE 10, according to which the risk rating is applied in combination with a sensitivity rating in order to perform the decision. For example, the sensitivity rating could define a threshold to which the risk rating is compared. If the risk rating is lower than the threshold, opportunistic access based on the configuration may be allowed, and otherwise not allowed. The sensitivity rating may be provided to the UE 10 by a further indicator, in the following also referred to as sensitivity indicator. The sensitivity rating may thus indicate how sensitive the concerned area, access node are cell is to access attempts using an erroneous configuration. For instance, an area, access node or cell in which the valid configuration includes unusually low initial transmit power when performing random access may be sensitive and hence indicate a high sensitivity rating, because it is probable that application of an erroneous configuration by the UE 10 will result in usage of a too high initial transmission power. In another example, a valid configuration for an area, access node or cell could include an unusual allocation of radio resources for the random access procedure, e.g., a configuration in which the radio resources typically used for random access procedures are instead used for other purposes. If the UE 10 then applies an erroneous configuration for an access attempt in this area, access node or cell, it is likely that this erroneous configuration includes another, more common allocation of radio resources for the random access procedure, which will cause the UE 10 to initiate the random access procedure using radio resources which are intended for other purposes, which in turn may result in harmful interference. Accordingly, in the case of a low sensitivity rating, the opportunistic access may be allowed even in the case of a comparatively high risk rating, while for a higher sensitivity rating the opportunistic access is not allowed. Similarly, in the case of a high sensitivity rating, the opportunistic access might not be allowed even in the case of a comparatively low risk rating, while for a lower sensitivity rating the opportunistic access is allowed.

The sensitivity indicator may be broadcasted to the UE 10, e.g., together with the AIT or the SSI or independently therefrom. The sensitivity indicator may be broadcasted with an update rate which can be higher or lower than the update rate used for broadcasting the SSI. Similar to the SSI, the sensitivity indicator does not need to be transmitted by the same node as the AIT. In some case, the sensitivity indicator may also be set individually for each UE 10, thereby allowing to take into account that different UEs 10 may exhibit different sensitivities with respect to access attempts based on an erroneous configuration.

In some scenarios the UE 10 may derive the sensitivity rating from other information, such as a broadcasted load indicator, e.g., indicating a current traffic load of the concerned area, access node, or cell. Such load indicator may for example indicate a fraction of a full traffic capacity which is being used or which is unused, or an absolute value of a remaining traffic capacity. For example, in the case of a high traffic load, the UE 10 may derive a high sensitivity rating, whereas in the case of a lower traffic load the UE 10 may derive a correspondingly lower sensitivity rating. Further, the UE 10 could derive the sensitivity rating from a type of access node or cell in which the opportunistic access attempt would occur, e.g., the UE 10 could use different sensitivity ratings depending on whether the considered cell is a macro cell, pico cell or femto cell. Further, the UE 10 may derive the sensitivity rating depending on a carrier frequency which would be used for the opportunistic access. For example, in the case of a higher carrier frequency the UE 10 may also assume a higher sensitivity rating. Further, the UE 10 may derive the sensitivity rating depending on a spectrum bandwidth which would be used for the opportunistic access. For example, in the case of a lower spectrum bandwidth the UE 10 may assume a higher sensitivity rating.

In view of resource efficiency, the risk indicator 330 does not need to be included in every entry of the AIT. For example, the risk indicator 330 could be included in the entries of only those configurations which are classified as risky, e.g., have a risk rating above a certain threshold. Further, the same risk indicator 330 could be valid for multiple configurations defined by the AIT. For example, the risk indicator 330 could be regarded as being also valid for a number of subsequent entries of the AIT, up to another entry in which the risk indicator 330 indicates a different risk classification.

In some scenarios, also a global risk indicator 330 may be used which is valid for multiple all configurations in the AIT or even a risk indicator 330 which applies to multiple AITs, e.g., all AIT which are used in the cellular network. If such risk indicator 330 classifies all the configurations of the AIT(s) as being risky, the effective result of this would be that the configurations can never be used for opportunistic access attempts, but only for regular accesses when the received AIT and SSI are not outdated. Such global risk indicator 330 may be transmitted in a general part of the AIT, e.g., in a dedicated entry or header part of the AIT, or could be broadcasted separately from the AIT. The latter option could be used to control independently from the AIT whether opportunistic access is generally allowed or not in the cellular network or a certain part thereof.

In some scenarios, the risk indicator 330 could also be associated with only a part of the access parameter(s) 320 of the configuration, i.e., with a subset of one or more access parameters, and/or multiple risk indicators 330 could be defined, each associated with a corresponding one of such subsets of the access parameters 320.

The setting of the risk indicator 330 and/or of the sensitivity indicator may be managed by an operator of the cellular network, e.g., through a corresponding control node or management node in a core network part of the cellular network. Such control node could generate the AITs used in the cellular network and define the risk indicators associated with the different configurations in the AITs. Further, such control node or management node could also provide corresponding control information to nodes which are responsible for broadcasting the AITs, e.g., to the access nodes 110, which then may set the risk indicator(s) accordingly.

Figure 4:
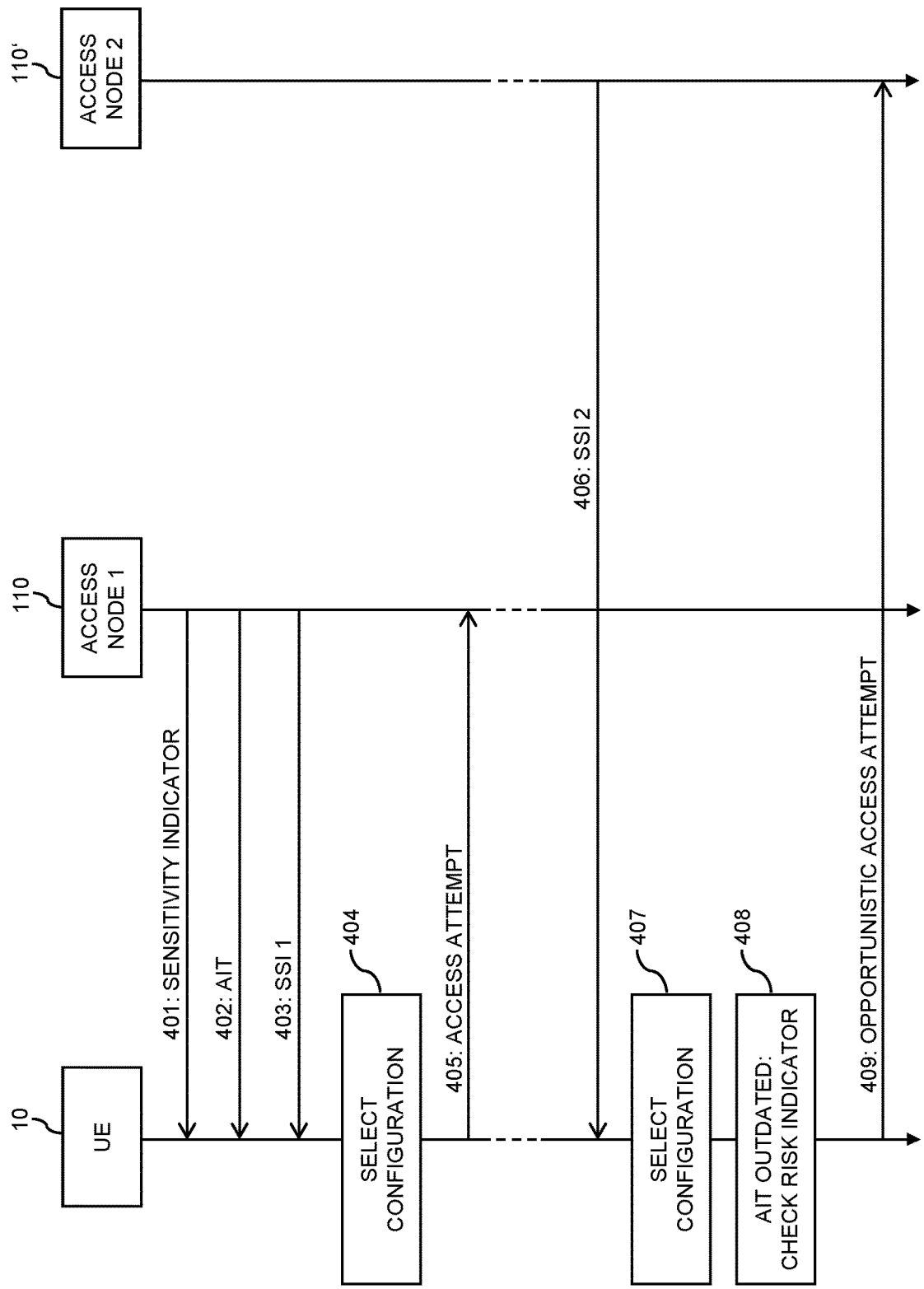
FIG. 4 shows exemplary processes according to an embodiment of the invention.

FIG. 4 shows an example of processes in which opportunistic access to the cellular network is controlled in accordance with the above concepts. The processes of FIG. 4 involve one of the UEs 10, one of the access nodes 110, in the following referred to as first access node 110, and one of the access nodes 110', in the following referred to as second access node 110'.

In the example of FIG. 4, the access node 110 sends a sensitivity indicator 401 to the UE 10. The sensitivity indicator 401 may for example be broadcasted in generic system information valid for an area of multiple cells, e.g., including a cell controlled by the first access node 110 and a cell controlled by the second access node 110'. Further, the sensitivity indicator 401 could also be addressed individually to the UE 10 by a unicast transmission and be valid for this UE 10, but not for other UEs.

Further, the first access node 110 transmits an AIT 402 to the UE 10, e.g., by broadcasting the AIT 402 according to a first update rate. In the example of FIG. 4, it is assumed that the AIT 402 includes a risk indicator for at least some of the configurations defined in the AIT 402, e.g., similar to the risk indicator 330 illustrated in FIG. 3.

Further, the first access node 110 transmits a first SSI 403 to the UE 10, e.g., by broadcasting the first SSI 403 according to a second update rate. As mentioned above, this second update rate is typically higher than the first update rate used for broadcasting the AIT.

At 404, the UE 10 selects a configuration from the AIT. This is accomplished based on the first SSI 403 received by the UE 10. Specifically, the UE 10 may select the entry identified by the first SSI 403 from the received AIT 402 and select the configuration defined by the access parameters included in this entry.

The UE 10 then performs an access attempt 405 to the cell controlled by the first access node 110 based on the selected configuration, e.g., by performing a random access procedure. At this time, the received AIT 402 and the received SSI 403 are assumed to be up to date because they have been received at the latest possible occasion. The access attempt 405 is thus performed in a regular manner, without a need to assess a risk associated with the selected configuration. It should be noted that the access attempt 405 does not need to be successful. For example, if the access attempt 405 involves performing a random access procedure, the access attempt 405 may fail due to contention of a random access channel used in the random access procedure.

At some later time, e.g., after one or more update occasions of the AIT, the UE 10 needs to perform a further access attempt to the cellular network, in this case to the cell controlled by the second access node 110'. For example, the UE 10 may have roamed to a cell served by the second access node 110' or the radio conditions for communication with the second access node 110' may be better compared to radio conditions for communication with the first access node 110.

The UE 10 receives a second SSI 406 which is broadcasted by the second access node 110', e.g., also at the second update rate used for broadcasting the first SSI 403 by the first access node 110. However, as explained in connection with FIG. 2, the second access node 110' does not transmit an AIT, but rather relies on other access nodes transmitting an AIT from which a configuration for accessing the cell controlled by the second access node 110' can be selected based on the second SSI 406.

In the example of FIG. 4, it is assumed that after receiving the AIT 402, the UE 10 did not receive any new AIT or updates of the AIT 402, e.g., due to missing update occasions because of poor radio conditions or because of the UE 10 having been in an energy saving state with limited receive capability.

Accordingly, at 408 the UE 10 will detect that the AIT is outdated, i.e., that the configuration as determined at 407 based on the SSI 406 is potentially erroneous. The UE 10 thus proceeds to check the risk indicator associated with the selected configuration. In the scenario of FIG. 4, it is assumed that the risk indicator indicates that the selected configuration is not risky, e.g., because the risk indicator indicates a risk rating which is lower than a threshold defined by the sensitivity indicator 401. The UE 10 therefore proceeds to perform an opportunistic access attempt 409, without waiting for an update of the received AIT 402.

Figure 5:
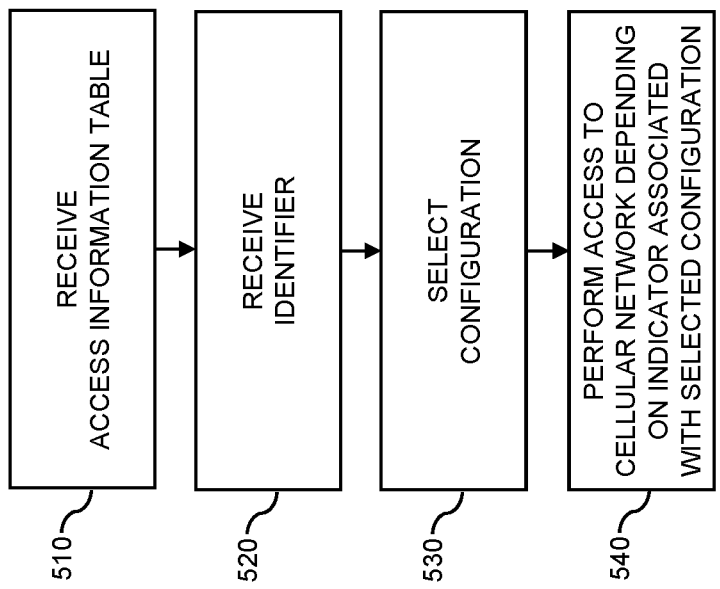
FIG. 5 shows a flowchart for schematically illustrating a method according to an embodiment of the invention.

FIG. 5 shows a flowchart for illustrating a method which may be utilized for implementing the illustrated concepts in a radio device. The radio device may correspond to a UE, such as one of the UEs 10. However, the radio device could also correspond to another kind of radio devices, such as a relay node or a device having only modem functionality. If a processor-based implementation of the radio device is used, the steps of the method may be performed by one or more processors of the radio device. In such a case the radio device may further comprise a memory in which program code for implementing the below described functionalities is stored.

At step 510, the radio device receives an AIT from the cellular network, such as the AIT 402. The AIT includes parameters of a plurality of configurations for controlling access of the radio device to the cellular network. Each configuration may be defined by one or more of the parameters. Some of the parameters may also be part of different configurations. Examples of such parameters are parameters relating to opportunities for performing a random access procedure, parameters relating to radio resources or transmit powers to be used for performing a random access procedure, parameters relating to opportunities for performing a paging procedure, parameters relating to configuration of one or more control channels between the radio device and the cellular network, parameters indicating (downlink) system bandwidth, parameters indicating alternative frequencies or radio access technologies present in the area, or parameters indicating PLMN (Public Land Mobile Network) identities, barring parameters or the like. Other examples of such parameters can include parameters relating to inter-RAT re-selection or parameters used to convey time or GPS related information. In typical scenarios, an erroneous configuration with respect to the latter kind of parameters may be less risky than an erroneous configuration with respect to the former kind of parameters.

At step 520, the radio device receives an identifier from the cellular network. The identifier may correspond to a signature sequence transmitted by an access node of the cellular network, such as the above-mentioned SSI.

The AIT may be transmitted at a first update rate, while the identifier is transmitted at a second update rate which is higher than the first update rate. The first update rate and the second update rate may be rates resulting from periodic update processes and/or rates resulting from aperiodic, e.g., even triggered update processes.

At step 530, the radio device selects one of the configurations from the AIT. This is accomplished depending on the identifier received at step 520.

At step 540, in response to determining that at least one of the received AIT and the received identifier is outdated, the radio device determines whether to access the cellular network on the basis of the selected configuration, i.e., whether to use the selected configuration for an opportunistic access. This determination is accomplished depending on an indicator associated with the selected configuration. In some scenarios, this indicator may be included in the AIT, e.g., in an entry identified by the identifier, such as illustrated in FIG. 3. In some scenarios, a corresponding indicator may be associated with each of the configurations. In some scenarios, the indicator may be valid for a plurality of the configurations. Further, it is also possible that a corresponding indicator is associated with only a part of the parameters of the selected configuration.

In response to determining not to access the cellular network on the basis of the selected configuration, the radio device may access the cellular network after receiving an update of at least one of the AIT and the identifier from the cellular network.

Further, in response to determining not to access the cellular network on the basis of the selected configuration, the radio device may access the cellular network on the basis of an alternative configuration which differs from the selected configuration with respect to one or more parameters. Such configuration may be a default configuration preconfigured in the radio device or a fall back configuration defined by the AIT.

The indicator may represent a risk rating that accessing the cellular network based on the selected configuration causes a problem. For example, the risk rating may be represented in at least two risk levels, e.g., "risky", "not risky", and optionally one or more intermediate risk levels. The risk rating may be encoded by single bit, e.g., a flag, or may be encoded by multiple bits, e.g., as a numerical value.

In some scenarios, the radio device may also receive a further indicator, such as the above-mentioned sensitivity indicator. The determination whether to access the cellular network on the basis of the selected configuration may then depend on a comparison of the risk rating defined by the indicator and a threshold defined by the further indicator.

Accordingly, a radio device which operates according to the method of FIG. 5 may be provided with a module configured to receive an AIT from a cellular network, such as explained in connection with step 510, a module configured to receive an identifier from the cellular network, such as explained in connection with step 520, a module configured to select, depending on the identifier, a configuration from the AIT, such as explained in connection with step 530, and a module configured to determine, based on an indicator associated with the selected configuration, whether to access the cellular network based on the selected configuration, such as explained in connection with step 540. It should be understood that such modules might not necessarily represent a hardware structure of the radio device.

Figure 6:
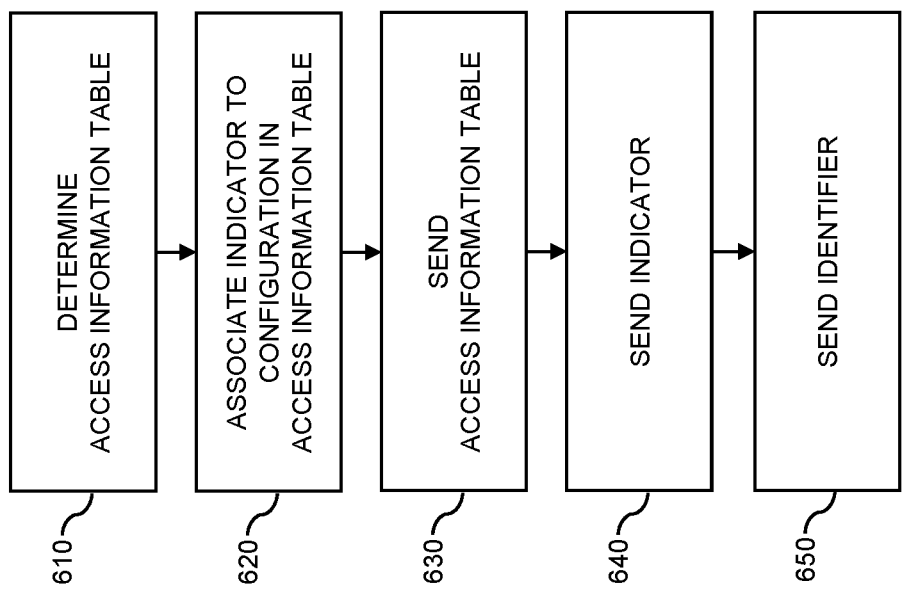
FIG. 6 shows a flowchart for schematically illustrating a further method according to an embodiment of the invention.

FIG. 6 shows a flowchart for illustrating a method which may be utilized for implementing the illustrated concepts in a node of a cellular network. The node may correspond to an access node, such as one of the access nodes 110. However, in some scenarios the node could also correspond to a more centralized node of the cellular network, e.g., a control or access management node in a core network part of the cellular network. If a processor-based implementation of the node is used, the steps of the method may be performed by one or more processors of the node. In such a case the node may further comprise a memory in which program code for implementing the below described functionalities is stored. The method may be used for controlling access of a radio device to the cellular network. The radio device may correspond to a UE, such as one of the UEs 10. However, the method may also be applied with respect to other kinds of radio devices, such as relay nodes or devices having only modem functionality.

At step 610, determines an AIT, such as the AIT 402. The AIT includes parameters of a plurality of configurations for controlling access of the radio device to the cellular network. Each configuration may be defined by one or more of the parameters. Some of the parameters may also be part of different configurations. Examples of such parameters are parameters relating to opportunities for performing a random access procedure, parameters relating to radio resources or transmit powers to be used for performing a random access procedure, parameters relating to opportunities for performing a paging procedure, parameters relating to configuration of one or more control channels between the radio device and the cellular network, parameters indicating (downlink) system bandwidth, parameters indicating alternative frequencies or radio access technologies present in the area, or parameters indicating PLMN (Public Land Mobile Network) identities, barring parameters or the like. Other examples of such parameters can include parameters relating to inter-RAT re-selection or parameters used to convey time or GPS related information. In typical scenarios, an erroneous configuration with respect to the latter kind of parameters may be less risky than an erroneous configuration with respect to the former kind of parameters.

The configurations are selectable on the basis of an identifier received by the radio device. The identifier may correspond to a signature sequence transmitted by an access node of the cellular network, such as the above-mentioned SSI.

The AIT may be transmitted at a first update rate, while the identifier is transmitted at a second update rate which is higher than the first update rate. The first update rate and the second update rate may be rates resulting from periodic update processes and/or rates resulting from aperiodic, e.g., even triggered update processes.

At step 620, the node associates an indicator with at least one the configurations. The indicator enables the radio device to determine whether to access the cellular network on the basis of one of the configurations when at least one of the AIT and the identifier as received by the radio device is outdated. This configuration is selected from the AIT based on the identifier. The association may be accomplished by including the indicator in a corresponding entry of the AIT. However, the indicator could also otherwise be associated to a specific configuration, group of configurations, or to an entire AIT, e.g., by providing the indicator with a reference to the configuration(s) or AIT. In some scenarios, the indicator may thus be included in the AIT, e.g., in an entry identified by the identifier, such as illustrated in FIG. 3. In some scenarios, a corresponding indicator may be associated with each of the configurations. In some scenarios, the indicator may be valid for a plurality of the configurations. Further, it is also possible that a corresponding indicator is associated with only a part of the parameters of the selected configuration.

The indicator may represent a risk rating that accessing the cellular network based on the selected configuration causes a problem. For example, the risk rating may be represented in at least two risk levels, e.g., "risky", "not risky", and optionally one or more intermediate risk levels. The risk rating may be encoded by single bit, e.g., a flag, or may be encoded by multiple bits, e.g., as a numerical value.

In some scenarios, the node may transmit a further indicator to the radio device, such as the above-mentioned sensitivity indicator. The determination whether to access the cellular network on the basis of the selected configuration may then depend on a comparison of the risk rating defined by the indicator and a threshold defined by the further indicator.

At step 630, the node may transmit the AIT to the radio device, e.g., by broadcasting at the above-mentioned first update rate.

At step 640, the node may transmit the indicator to the radio device, e.g., as part of the AIT or separately in a broadcast, multicast or unicast transmission.

In some scenarios, the node may also transmit a further indicator to the radio device, such as the above-mentioned sensitivity indicator. The further indicator may enable the radio device to perform the determination whether to access the cellular network on the basis of the selected configuration depending on a comparison of the risk rating defined by the indicator and a threshold defined by the further indicator.

At step 650, the node may transmit the identifier to the radio device, e.g., by broadcasting at the above-mentioned second update rate.

Accordingly, a node which operates according to the method of FIG. 6 may be provided with a module configured to determine an AIT, such as explained in connection with step 610, and a module configured to associate an indicator with at least one configuration defined by the AIT, such as explained in connection with step 620. Further, the node may be provided with a module configured to send the AIT to a radio device, such as explained in connection with step 630. Further, the node may be provided with a module configured to send the indicator to the radio device, such as explained in connection with step 640. Further, the node may be provided with a module to send an identifier to the radio device, which enables the radio device to select one of the configurations from the AIT, such as explained with step 650. It should be understood that such modules might not necessarily represent a hardware structure of the node.

It is to be understood that the methods of FIGS. 5 and 6 may also be combined in a system which includes one or more radio devices operating according to the method of FIG. 5 and one or more nodes operating according to the method of FIG. 6. Further, such system may also include additional nodes which transmit an identifier as explained in connection with step 640 of FIG. 6, but do not transmit an AIT.

Figure 7:
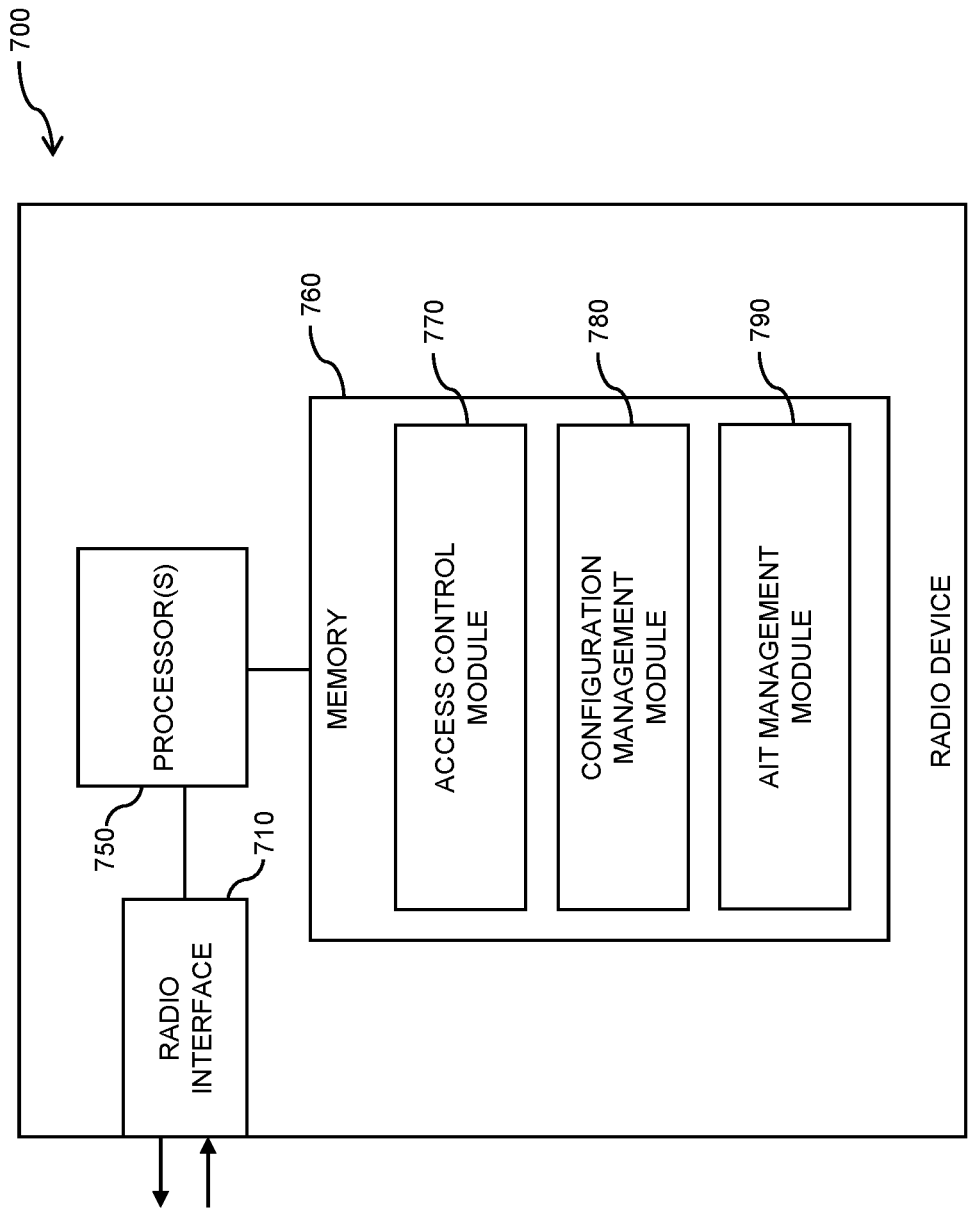
FIG. 7 schematically illustrates a radio device according to an embodiment of the invention.

FIG. 7 illustrates exemplary structures which may be used for implementing the above concepts in a radio device 700, such as one of the UEs 10. The radio device 700 may for example correspond to a mobile phone or to some other type of portable or stationary computing device.

As illustrated, the radio device 700 may include a radio interface 710 for enabling access of the radio device 700 to the cellular network. Further, the radio device 700 may include one or more processors 750 coupled to the interfaces 710, 720, and a memory 760 coupled to the processor(s) 750. The memory 760 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 760 includes suitably configured program code to be executed by the processor(s) 750 so as to implement the above-described functionalities of a radio device. In particular, the memory 760 may include various program code modules for causing the radio device 700 to perform processes as described above, e.g., corresponding to the method steps of FIG. 5.

As illustrated, the memory 760 may include an access control module 770 for implementing the above-described functionalities of accessing the cellular network based on a configuration selected from an AIT. Further, the memory 760 may include a configuration management module 780 for implementing the above-described functionalities of selecting a configuration from an AIT based on a received SSI and determining whether to use the selected configuration for performing an opportunistic access attempt. The configuration management module 760 may also implement the above-mentioned functionalities of receiving the SSI, risk indicator, and/or sensitivity indicator. Further, the memory 760 may also include an AIT management module for implementing the above-described functionalities of receiving or updating an AIT or of assessing whether a previously received AIT or SSI is outdated.

It is to be understood that the structures as illustrated in FIG. 7 are merely schematic and that the radio device 700 may actually include further components which, for the sake of clarity, have not been illustrated, e.g., further interfaces or processors. Also, it is to be understood that the memory 760 may include further types of program code modules, which have not been illustrated, e.g., program code modules for implementing known functionalities of a UE. According to some embodiments, also a computer program may be provided for implementing functionalities of the radio device 700, e.g., in the form of a physical medium storing the program code and/or other data to be stored in the memory 760 or by making the program code available for download or by streaming.

Figure 8:
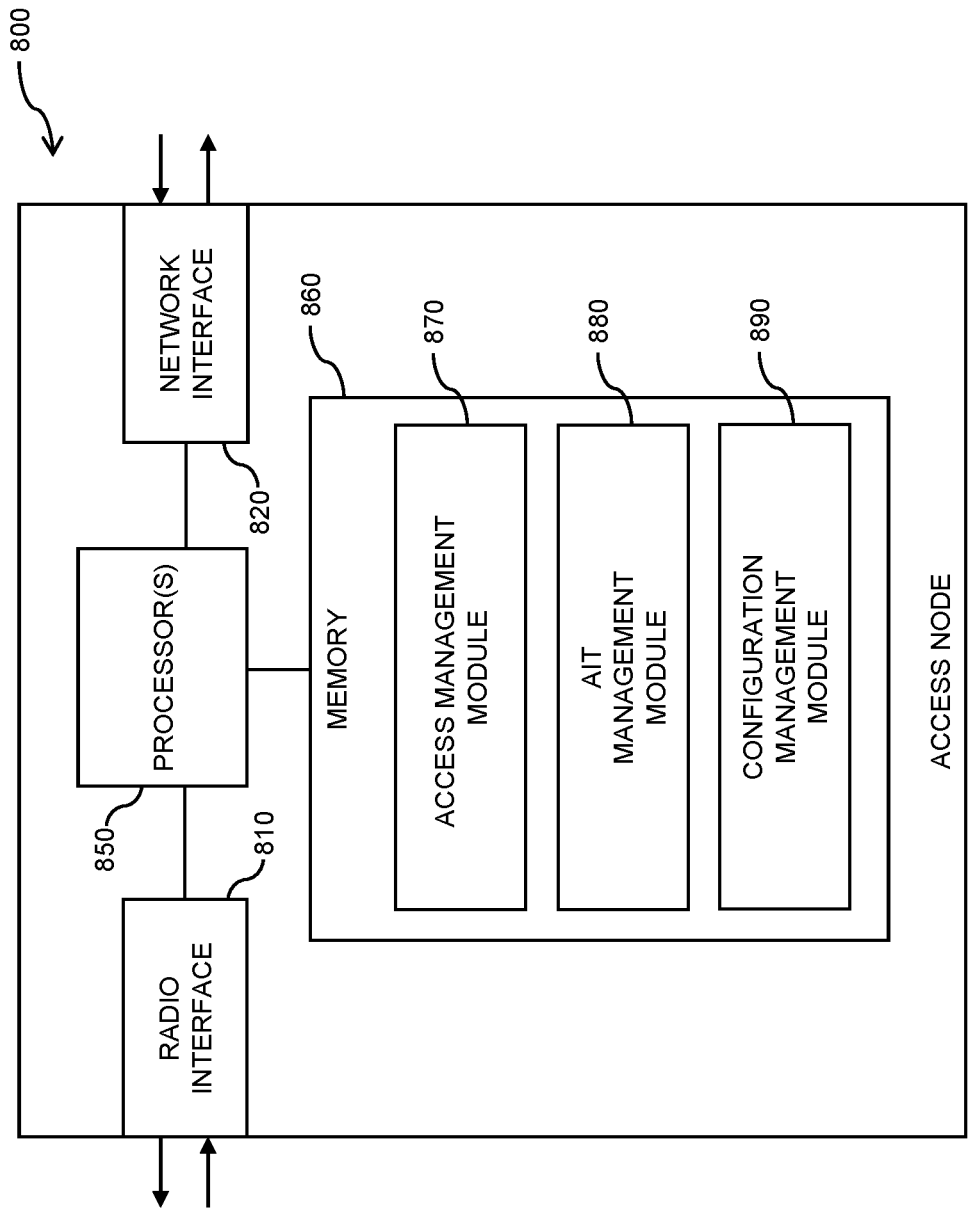
FIG. 8 schematically illustrates an access node according to an embodiment of the invention.

FIG. 8 illustrates exemplary structures which may be used for implementing the above concepts in a node 800 of a cellular network radio device. In the illustrated example, the node 800 is assumed to be an access node such as one of the access nodes 110.

As illustrated, the access node 800 may include a radio interface 810 for enabling access of one or more radio devices, such as the radio device 700 or the UEs 10, to the cellular network. Further, the access node 800 may include a network interface 820 for connecting to a core network part of the cellular network and/or to other access nodes.

Further, the access node 800 may include one or more processors 850 coupled to the interfaces 810, 820, and a memory 860 coupled to the processor(s) 850. The memory 860 may include a ROM, e.g., a flash ROM, a RAM, e.g., a DRAM or SRAM, a mass storage, e.g., a hard disk or solid state disk, or the like. The memory 860 includes suitably configured program code to be executed by the processor(s) 850 so as to implement the above-described functionalities of the access node 800. In particular, the memory 860 may include various program code modules for causing the access node 800 to perform processes as described above, e.g., corresponding to the method steps of FIG. 6.

As illustrated, the memory 860 may include an access management module 870 for implementing the above-described functionalities of controlling access of a radio device to the cellular network, e.g., by performing a random access procedure or some other access procedure, based on a configuration defined by an AIT. Further, the memory 860 may include an AIT management module 880 for implementing the above-described functionalities of determining or transmitting AITs. Further, the memory 860 may also include a configuration management module for implementing the above-described functionalities of associating an indicator with at least one configuration defined by an AIT. The configuration management module 860 may also implement the above-mentioned functionalities of sending the SSI, risk indicator, and/or sensitivity indicator.

It is to be understood that the structures as illustrated in FIG. 8 are merely schematic and that the access node 800 may actually include further components which, for the sake of clarity, have not been illustrated, e.g., further interfaces or processors. Also, it is to be understood that the memory 860 may include further types of program code modules, which have not been illustrated, e.g., program code modules for implementing known functionalities of an access node. According to some embodiments, also a computer program may be provided for implementing functionalities of the access node 800, e.g., in the form of a physical medium storing the program code and/or other data to be stored in the memory 860 or by making the program code available for download or by streaming.

As can be seen, the concepts as described above may be used for efficiently controlling access to a cellular network. Specifically, the concepts may be used to allow benefitting from the possibility of performing opportunistic access attempts when a received AIT or a received SSI is outdated. In this way, low latency may be achieved in many situations, without requiring an excessive increase of signaling, e.g., associated with updating of AITs.

It is to be understood that the examples and embodiments as explained above are merely illustrative and susceptible to various modifications. For example, the illustrated concepts may be applied in connection with various radio technologies, without limitation to the above-mentioned example of a 5G radio technology. Further, the illustrated concepts may be applied in connection with various kinds of access nodes and radio devices. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

What is claimed is:

1. A method in a radio device, the method comprising:
   receiving, by the radio device, an identifier from a cellular network;
   selecting, by the radio device, depending on the identifier, a configuration from an access information table comprising parameters for each of a plurality of configurations for controlling access to the cellular network; and in response to determining that at least one of the access information table and the received identifier is outdated, determining, by the radio device, depending on an indicator associated with the selected configuration, whether to access the cellular network on the basis of the selected configuration.

2. The method of claim 1, wherein the method comprises determining not to access the cellular network on the basis of the selected configuration, and wherein the method further comprises accessing the cellular network after receiving an update of at least one of the access information table and the identifier from the cellular network.

3. The method of claim 1, wherein the method comprises determining not to access the cellular network on the basis of the selected configuration, and wherein the method further comprises accessing the cellular network on the basis of an alternative configuration that differs from the selected configuration with respect to one or more parameters.

4. The method of claim 1, wherein the indicator is specific to the selected configuration, there being a corresponding indicator associated with each of the plurality of configurations in the access information table.

5. The method of claim 1, wherein the indicator indicates a risk rating that accessing the cellular network based on the selected configuration causes a problem, the risk rating representing one of at least two risk levels.

6. The method of claim 5, further comprising receiving a further indicator, wherein said determining whether to access the cellular network on the basis of the selected configuration depends on a comparison of the risk rating defined by the indicator and a threshold defined by the further indicator.

7. The method of claim 1, wherein the parameters of the access information table relate to opportunities for performing a random access procedure.

8. The method of claim 1, wherein the parameters of the access information table relate to opportunities for performing a paging procedure.

9. The method of claim 1, wherein the parameters of the access information table relate to configuration of one or more control channels between the radio device and the cellular network.

10. The method of claim 1, wherein the identifier corresponds to a signature sequence transmitted by an access node of the cellular network.

11. A radio device comprising:
radio interface circuitry; and
processing circuitry operatively coupled to the radio interface circuitry and configured to:
  receive an identifier from a cellular network, via the radio interface circuitry;
  depending on the identifier, select a configuration from an access information table comprising parameters for each of a plurality of configurations for controlling access to the cellular network; and
  in response to determining that at least one of the access information table and the received identifier is outdated, determine whether to access the cellular network on the basis of the selected configuration, in dependence on an indicator associated with the selected configuration.

12. The radio device of claim 11, wherein the access information table comprises the indicator.

13. The radio device of claim 11, wherein the indicator is specific to the selected configuration, there being a corresponding indicator associated with each of the plurality of configurations in the access information table.

14. The radio device of claim 11, wherein the indicator indicates a risk rating that accessing the cellular network based on the selected configuration causes a problem, the indicated risk rating representing one of at least two risk levels.

15. The radio device of claim 14, wherein the processing circuitry is further configured to receive a further indicator, via the radio interface circuitry, and to determine whether to access the cellular network on the basis of the selected configuration depending on a comparison of the risk rating defined by the indicator and a threshold defined by the further indicator.

16. The radio device of claim 11, wherein the parameters of the access information table relate to opportunities for performing a random access procedure.

17. The radio device of claim 11, wherein the parameters of the access information table relate to opportunities for performing a paging procedure.

18. The radio device of claim 11, wherein the parameters of the access information table relate to configuration of one or more control channels between the radio device and the cellular network.

19. The radio device of claim 11, wherein the identifier corresponds to a signature sequence transmitted by an access node of the cellular network.

* * * * *